United States Patent
DeLeon et al.

(10) Patent No.: US 10,438,434 B1
(45) Date of Patent: Oct. 8, 2019

(54) NETWORK-ENABLED GROUP DECISION-MAKING USING APPROVAL VOTING

(71) Applicant: Sujjest, LLC, Minneapolis, MN (US)

(72) Inventors: Solomon DeLeon, Minneapolis, MN (US); Jeffrey Cole, Renton, WA (US); Kjell Hansen, Normandy Park, WA (US)

(73) Assignee: SUJJEST, LLC, Minneapolis, MN (US)

( * ) Notice: Subject to any disclaimer, the term of this patent is extended or adjusted under 35 U.S.C. 154(b) by 0 days.

(21) Appl. No.: 16/194,534

(22) Filed: Nov. 19, 2018

Related U.S. Application Data

(60) Provisional application No. 62/652,055, filed on Apr. 3, 2018.

(51) Int. Cl.
  *G07C 13/00* (2006.01)
  *G06Q 50/00* (2012.01)
  *H04L 29/06* (2006.01)

(52) U.S. Cl.
  CPC ............ *G07C 13/00* (2013.01); *G06Q 50/01* (2013.01); *H04L 65/4038* (2013.01); *G06Q 2230/00* (2013.01)

(58) Field of Classification Search
  CPC .... G07C 13/00; G06Q 2230/00; G06Q 50/01; G06F 3/04847; G06T 11/206; G06T 11/40; G06T 11/60; H04N 21/8545
  See application file for complete search history.

(56) References Cited

U.S. PATENT DOCUMENTS

| | | | |
|---|---|---|---|
| 2014/0164074 A1* | 6/2014 | Theo | G06Q 10/06 705/12 |
| 2014/0282650 A1* | 9/2014 | Viles | H04N 21/23424 725/13 |
| 2015/0058238 A1* | 2/2015 | Milley | H04W 4/21 705/319 |
| 2015/0382082 A1* | 12/2015 | Buckner | H04N 7/17318 725/109 |
| 2017/0206611 A1* | 7/2017 | Morgia | G06F 16/24578 |

* cited by examiner

*Primary Examiner* — Suezu Ellis
(74) *Attorney, Agent, or Firm* — Fredrikson & Byron, P.A.

(57) ABSTRACT

A computer-implemented method for making one or more decisions in a group decision-making session includes receiving a group initiation input specifying one or more participants to be invited to the session, receiving an input specifying a first prompt along with related first and second options, and receiving, from one or more participants in the session, votes for the first option and/or the second option. It also includes displaying a racetrack that includes a first icon representing the first option, a second icon representing the second option, a number of individual steps, and a first finish line. The first and second icons are displayed on a respective step that corresponds to a number of votes received for the respective first and second option. The first finish line can be adjusted so as to adjust the threshold number of votes needed to determine the winning option for the first prompt.

20 Claims, 11 Drawing Sheets

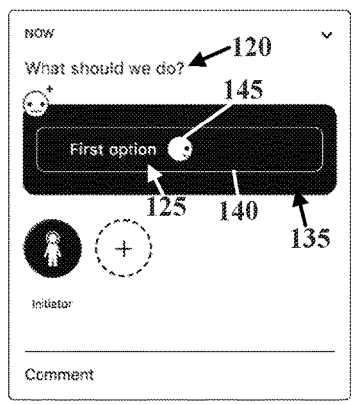
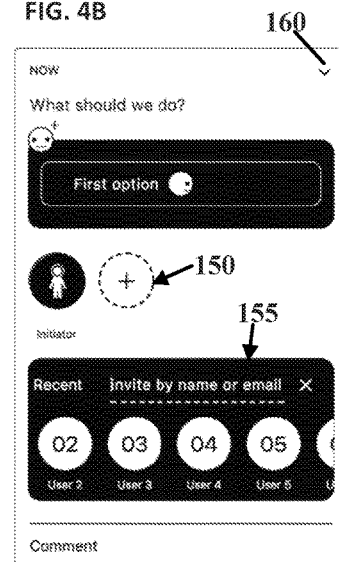
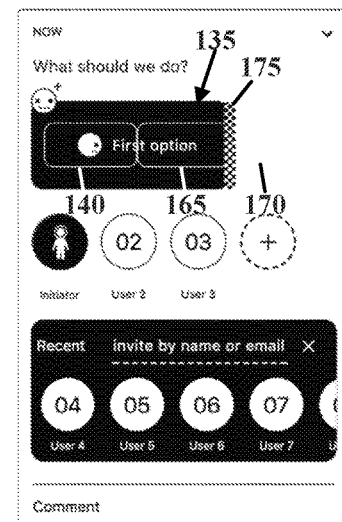
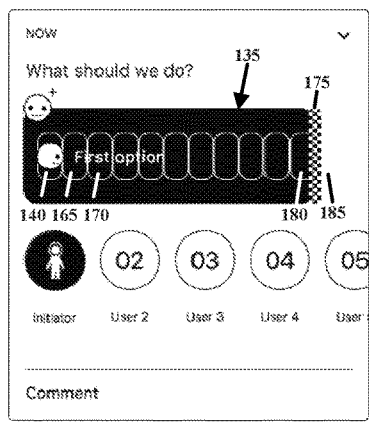
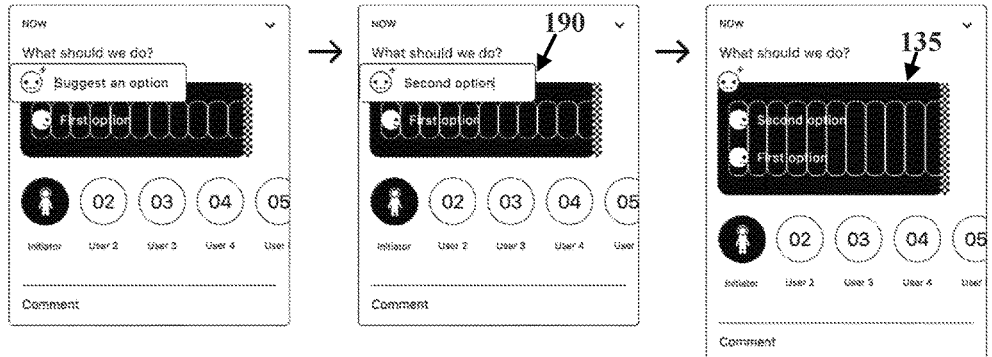

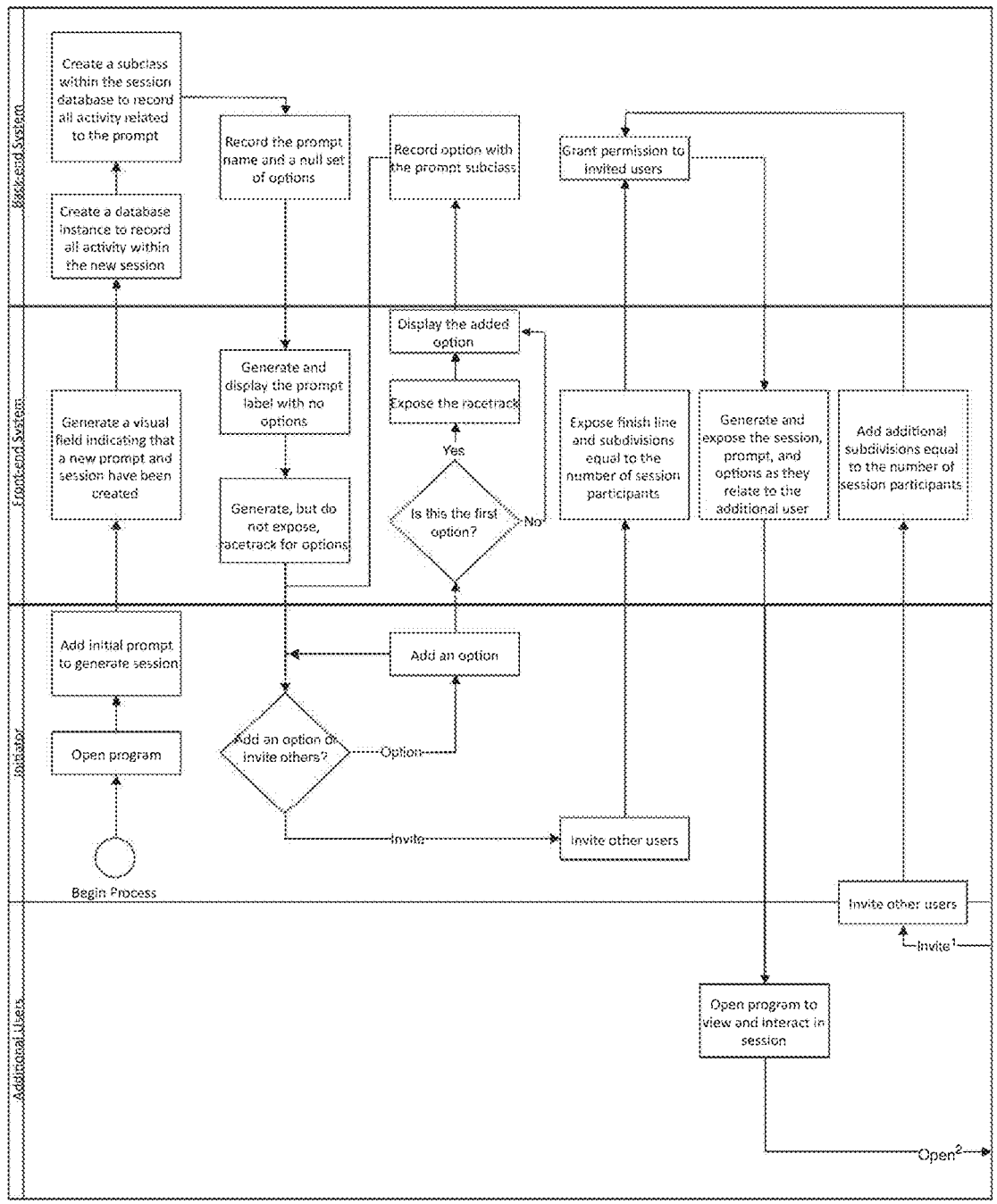

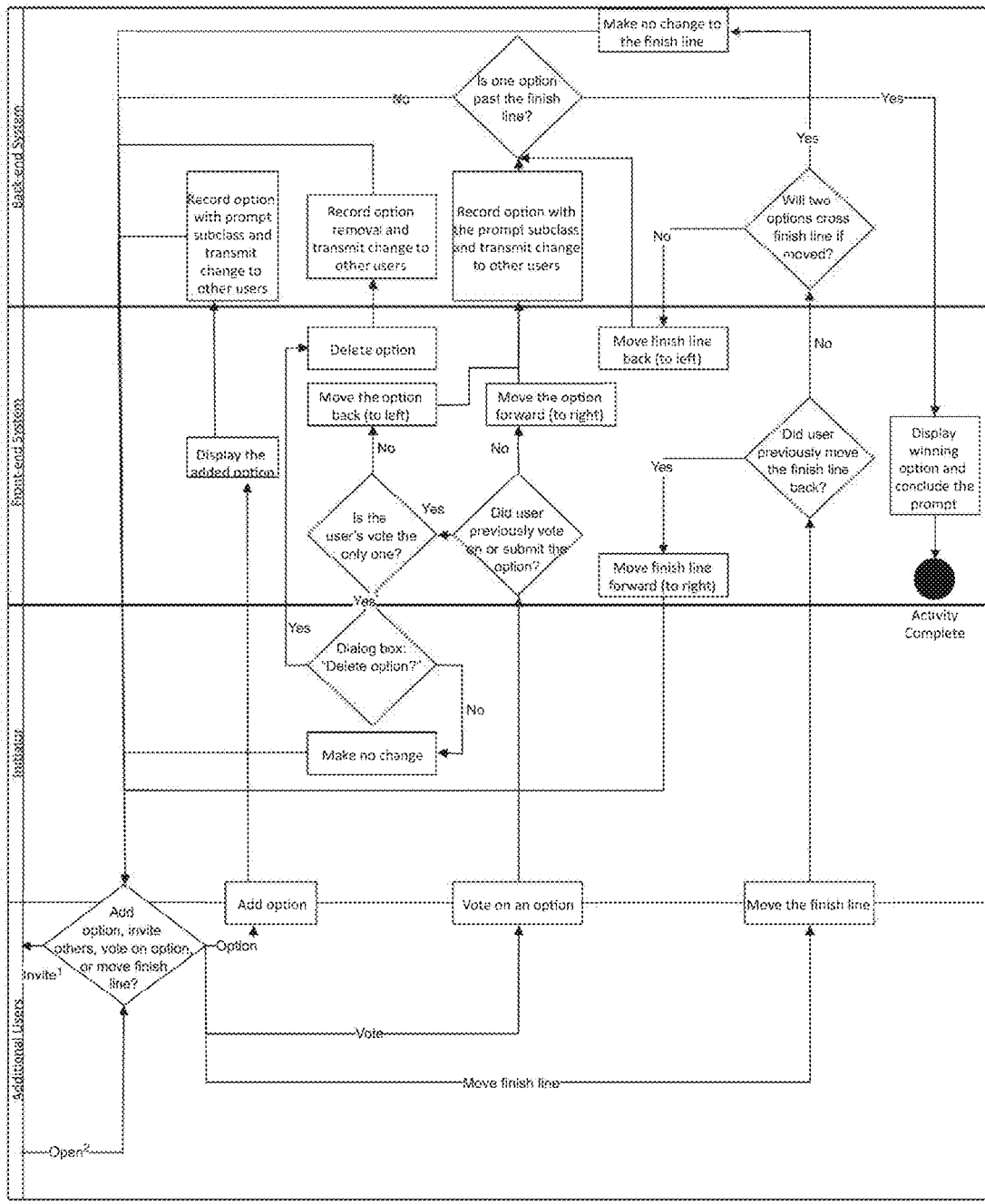

NETWORK-ENABLED GROUP DECISION-MAKING USING APPROVAL VOTING

RELATED APPLICATION

This application claims the benefit of U.S. Provisional Application No. 62/652,055 filed Apr. 3, 2018, the contents of which are hereby incorporated by reference.

TECHNICAL FIELD

This disclosure relates generally to devices, systems, and methods for network-enabled decision-making. Embodiments disclosed herein can provide devices, systems, and methods that allow two or more users to participate in one or more network-enabled decision-making sessions utilizing voting (e.g., approval voting) on options pertaining to a prompt so as to bring an option to a decision threshold.

BACKGROUND

Group decision-making is a process for maintaining social cohesion while negotiating collective responses to changing conditions. Large-scale, multifaceted collective decision-making and delegation of responsibility can be important to both democratic governance and commercial enterprise. Meanwhile, smaller, simpler decisions, such as those among family or friends, are pervasive. These include decisions such as where and when to meet for dinner and which movie to see together. Although the factors involved in these decisions are often more limited and the decision process itself is usually informal, small groups still frequently fail to reach satisfactory agreements easily.

Group members may struggle to share their personal inclinations in competitions for group attention, where some voices and personalities in the group dominate and others are muted; consequently, the group must work with information that may be incomplete and distorted by social factors, such as peer pressure and disincentives to be critical. If participant preferences for a set of options presented with equal salience were quantified directly and automatically, individual inclinations could be better aggregated into an egalitarian collective choice. State of the art electronic communication tools, which are not designed and specialized for group decision-making, typically aspire to a high-bandwidth reduplication of face-to-face interaction; however, such systems do not necessarily bring a group closer to reaching fully representative group decisions.

Communication tools, including email and text messaging, allow all participants in the group to share options and preferences, but piecing together an organized picture from a freeform, linear stream of information produced by such tools can be challenging. In some cases, group attention can resemble a baton passed about chaotically, leaving a record to which not everyone in the group has an incentive to attend to fully. A group member's relative preference may be ambiguous, gleaned only from the tone and voice of that group member's writing. Furthermore, early comments can disproportionately anchor and bias later responses.

In many cases, polling may offer greater clarity and can reduce the relative importance of written responses. Each vote may count equally, whether it comes near the beginning or end of the decision-making process. Traditional polling presents preset options that cannot be altered by the people polled. Such polling still lacks finality; nothing short of consensus definitively implies a group decision in such a poll.

To conclude deliberation, both communication tools and polls essentially rely on some member to ask, "Are we there yet?" Whether or not an informal move to close a poll comes at a reasonable point during the process, the group must branch the decision to close the poll as a separate group decision before affirming or returning to the poll's main topic(s) of consideration. Uncertainty about when enough options and preferences have been collected results in messy endings that typically rely on an informally designated or self-appointed leader (a group member who subjectively integrates preferences and terminates the process).

SUMMARY

Group decision-making can be made both flexible and effective with a threshold between indecision and decision that is adjustable by the group. Although a simple majority works in some voting systems, it is not appropriate for the needs of every small group. For some decision types, unanimous accord may be a requirement. For other decisions, especially considering the needs of groups with less overall participation among those invited to help decide, a plurality decision may suffice. How many votes should result in an option becoming a decision may not be known in advance of getting a group together. A decision threshold may be collectively determined during the process of submitting and voting on options and inviting new participants to the group in a way that does not interrupt or distract from the main decision topic.

In an embodiment, users are provided a system in which they participate in group decision-making sessions. Within each session, users may create one or more prompts, each prompt reflecting a decision for the group to make. Users may submit options in response to the prompt(s) and indicate their individual preferences regarding the options, collectively making the decision(s) by obtaining sufficient support for a single option in response to each prompt to cross a decision threshold less than or equal to the number of group participants, wherein a session's decision threshold is capable of being independently adjusted by each participant.

In this embodiment, to initiate a session, a user generates an initial prompt for the group to resolve. A prompt can be a short question or other expression that communicates to the participants the question the participants will be deciding and solicits options from the participants. A session initiator creates one or more prompts (in some embodiments allowing other participants permission to create prompts as well), thus defining what the group is to decide together during a given session. In one embodiment, the default prompt-creation permission is such that only the initiator may create the prompt(s) for the group. In another embodiment, the initiator may also choose to allow all session participants, or a subgroup of the session participants, to submit prompts.

Also in this embodiment, a session participant may submit options to a prompt and vote for options submitted by others. A user may vote for all, some, or none of the available options; voting systems of this general type are known as "approval voting" systems. Each vote advances an option one step closer to the session's decision threshold, with the total number of steps in the race to decide any undecided prompt in the session equal to the number of session participants. Although a user may choose to retract their vote for a given option, the user may not be able to move any option forward by more than one step.

In this embodiment, voting in response to a prompt can continue until a single option crosses the decision threshold. In various embodiments, a session begins with the decision threshold set between the penultimate and final steps and every session participant has the ability to lower the decision threshold by one step, provided that lowering the decision threshold would not cause the decision threshold to cross more than one option submitted to a given prompt (thus allowing only a single winner for each prompt), and provided that the lowered decision threshold level not pass below the position representing two votes to win. In one embodiment, the initiator may choose to initialize the decision threshold at the start of a session below the position representing consensus. In this particular embodiment, this position may be at a fixed number of votes, a percentage of the number of participants (e.g. 50% of the participants) or some other specific number of votes greater than two.

In addition, in this embodiment, once a single option crosses the decision threshold, the prompt is considered to be answered and the agreement between all participants who voted for the option is final. In an embodiment, when all prompts in a session are decided, the initiator may be shown a dialog box that asks if the group intends to make further decisions during the session, or if voting activity in the session has completed; in such an embodiment, if the initiator confirms that the session is complete, the program will disable the creation of any further prompts for that session.

One exemplary embodiment includes a network-enabled program for group decision-making among geographically disparate individuals through discrete sessions. A session can be defined as a group interacting on a network using said program to make one or more related joint decisions (for example, a group selecting a time and place to do an activity together). During a session, one or more prompts can be created by one or more session participants in order to frame the nature of decision(s) the group will make and to solicit options from the group. A decision emerges from a competition between options submitted to a given prompt by session participants. Approval voting (e.g., each participant can vote for each option once, vote for some but not all options, or vote for no options) can be the method by which participants advance the option(s) they prefer and also the method by which participant(s) may independently and incrementally lower the decision threshold of collective support at which an option becomes a decision, from unanimity to majority or plurality.

Another exemplary embodiment includes a computer-implemented method for making one or more decisions in a group decision-making session. This method embodiment includes the steps of receiving a group initiation input specifying a number of participants to be invited to the group decision-making session, receiving input specifying a first prompt along with a first option that pertains to the first prompt and a second option that pertains to the first prompt, receiving, from one or more participants in the group decision-making session, votes for the first option and/or the second option, displaying a racetrack, receiving, from a first participant in the group decision-making session, a first finish line adjustment input, moving a position of the first finish line so as to adjust the threshold number of votes needed to determine the winning option for the first prompt in response to the first finish line adjustment input, displaying the first option as the winning option for the first prompt in response to the first icon crossing the first finish line. The displayed racetrack can include a first icon representing the first option, a second icon representing the second option, a number of individual steps, and a first finish line. The first icon can be displayed on one step of the number of individual steps that corresponds to a number of votes received for the first option and the second icon can be displayed on one step of the number of individual steps that corresponds to a number of votes received for the second option. The first finish line can represent a threshold number of votes needed to determine a winning option for the first prompt. And, the first finish line can be initially positioned after one step of the number of individual steps that corresponds to a number of votes that is one less than the threshold number of votes.

In various embodiments disclosed herein, describing the position of the finish line as "after" a specified step can refer to the position of the finish line relative to such specified step in a direction of icon travel along the racetrack. The position of the finish line in these cases can be such as to require that the respective icon receive one vote more than a number of votes that corresponds to the specified step after which the finish line is positioned in order to be considered as having crossed the finish line. Thus, depending on the racetrack orientation and direction of icon travel along the racetrack, the position of the finish line as "after" a specified step can mean that the finish line is positioned immediately to the right of, immediately left of, above, or below, the specified step.

A further exemplary embodiment includes a non-transitory computer-readable storage article having computer-executable instructions stored thereon to cause at least one programmable processor to: display a first prompt in response to user input specifying the first prompt, display a racetrack, and display the first option as the winning option for the first prompt in response to the first icon crossing a first finish line. The displayed racetrack can include a first icon representing a first option that pertains to the first prompt, a second icon representing a second option that pertains to the first prompt, a number of individual steps, and the first finish line. The first icon can be displayed on one step of the number of individual steps that corresponds to a number of votes for the first option and the second icon can be displayed on one step of the number of individual steps that corresponds to a number of votes for the second option. The first finish line can represent a threshold number of votes needed to determine a winning option for the first prompt. The first finish line can be positioned after one step of the number of individual steps that corresponds to a number of votes that is one less than the threshold number of votes. And, a position of the first finish line can be movable in response to user input so as to adjust the threshold number of votes needed to determine the winning option for the first prompt.

The details of one or more examples are set forth in the accompanying drawings and the description below. The described program and the related systems, methods, objects, features, and advantages of the present disclosure will be apparent to those skilled in the art from the following detailed description and the attached figures.

BRIEF DESCRIPTION OF DRAWINGS

The following drawings are illustrative of particular embodiments of the present invention and therefore do not limit the scope of the invention. The drawings are intended for use in conjunction with the explanations in the following description. Embodiments of the invention will hereinafter be described in conjunction with the appended drawings, wherein like numerals denote like elements. The drawings illustrate examples generally and are not intended to limit the scope of the claims and are not necessarily drawn to scale.

FIG. 4A illustrates exposure of a single-step "racetrack" as a result of submitting an initial option, according to an example embodiment.

FIG. 4B illustrates the exposure of the invitation panel as a result of selecting the invitation icon, according to an example embodiment.

FIG. 5 illustrates an invitation of two users to a group decision-making session, resulting in the subdivision of a racetrack into three steps and exposure of a decision threshold, according to an example embodiment.

FIG. 6 illustrates an invitation of additional users to a session and the closure of the invitation panel, according to an example embodiment.

FIG. 7 is a sequence diagram illustrating input and submission of a second option by a session initiator, according to an example embodiment.

FIG. 16 is a flowchart of possible user actions, as well as front-end and back-end system processes involved in a group deciding one prompt, according to an example embodiment.

DETAILED DESCRIPTION

The following detailed description is exemplary in nature and provides some practical illustrations and examples. Those skilled in the art will recognize that many of the noted examples have a variety of suitable alternatives that are to be considered within the scope of the present disclosure.

Figure 1:
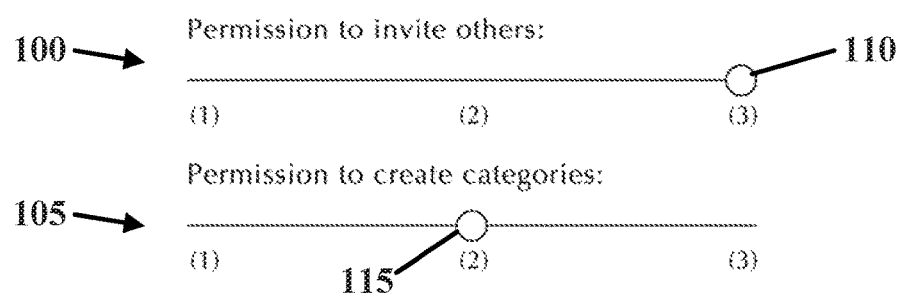
FIG. 1 illustrates a set of controls that may be used by a session initiator to assign permissions to other users in a group, according to an example embodiment.

FIG. 1 illustrates a set of controls that may be used by a session initiator to assign permissions to other users in a group, according to an example embodiment. In FIG. 1 and all other figures, the software application (or "app") may run on a user's computer, smartphone, tablet, or other computing device. In an embodiment of this app that involves a session setup phase, a user (hereafter referred to as the "initiator") may set the scope of the permissions assigned to other session participants. FIG. 1 shows a first permission 100 and a second permission 105. In the illustrated embodiment, the scope of the first permission 100 can be set using a first slider control 110 and the scope of the second permission 105 may be set using a second slider control 115.

Using the first slider control 110, the session initiator may choose one of three levels to indicate which session participants are allowed to invite others to join the session: (1) only the initiator, (2) the initiator and anyone the initiator has invited to the session, or (3) the initiator, anyone the initiator has invited to the session, and any users invited by session participants other than the initiator. In the example illustrated in FIG. 1, the initiator has set the permission level of the first slider control 110 to level (3).

Using the second slider control 115, the session initiator may choose one of three levels (which may be identical to the levels of the first slider control) to indicate which session participants are allowed to create prompts. In the example illustrated in FIG. 1, the session initiator has set the permission level of the second slider control 115 to level (2), indicating that the initiator as well as anyone the initiator has invited to the session has permission to create prompts.

The initiator may set these two controls in either order; after the session initiator has set both permission controls, the app may advance to the next screen (FIG. 2), where the session initiator may submit a prompt. The process flowchart (FIG. 16) illustrates an example embodiment that does not include the session set up procedure illustrated in FIG. 1. The process "Add initial prompt to generate session" in FIG. 16 corresponds to the example user interface sequence diagram illustrated in FIG. 2.

In an embodiment, a user's profile in the app includes a list of that user's contacts and corresponding contact information. In an embodiment of the app in which groups are not assembled through private user-to-user invitations, every contact of a session initiator may be able to view when the session initiator submits a prompt. For every app user, there may be a feed or timeline of public prompts posted by other users in the user's network. If a user sees a prompt to which the user is inclined to respond (by submitting an option to the prompt or approving one or more of the prompt's existing options), then upon interaction with the prompt, the user can be counted and displayed as a participant in the group decision.

Prior to submitting a public prompt, a session initiator may specify how many votes the session initiator will require for an option to become a group decision. In an embodiment, a minimum of two votes is required for an option to become a group decision. In another embodiment, an upper limit exists for the number of votes that a session initiator may specify. An initiator-specified decision threshold value for a public prompt may or may not be adjustable by the session initiator or other session participants. Requiring that the session initiator specify how many votes are required for an option to win is an opportunity for the session initiator to communicate both a group-size preference to other app users in their network and to serve as participation goal; furthermore, it may establish a specific end condition to a process in which unanimous agreement would in many cases not represent an acceptable or reasonable end condition. For example, if a session initiator puts forth a public prompt and an option, and then the first session participant approves that option, terminating the voting process before other users have a chance to respond to the prompt would be inappropriate in most cases.

The embodiment illustrated in the included figures represents the main, exemplary case described in this detailed description. In such an embodiment, a session initiator may begin a new session via the prompt submission action and the system may assign the session a default state that is equivalent in FIG. 1 to (3) for invitation permission and (2) for prompt creation permission.

Figure 2:
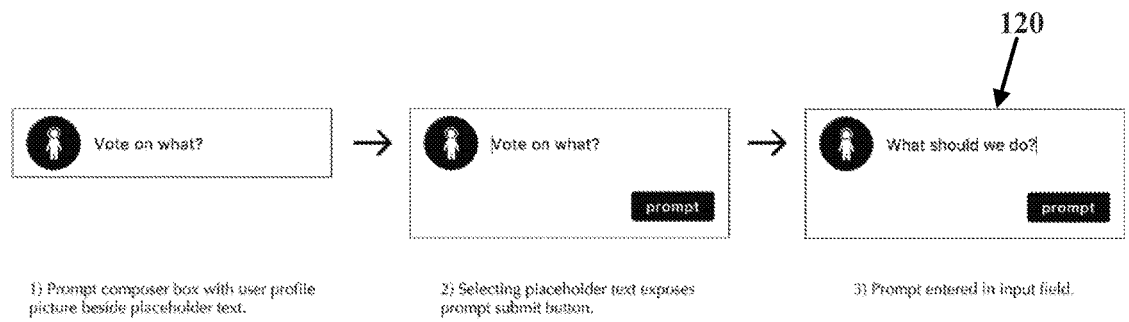
FIG. 2 is a sequence diagram illustrating the creation of an initial prompt, according to an example embodiment.

FIG. 2 is a sequence diagram illustrating the creation of an initial prompt 120 on the app, according to an example embodiment. The user may input the prompt 120 in FIG. 2, or the app may recommend one or more prompts from which the user may select, for example on the same screen as the line for text entry or via a modal window. The user may enter a prompt or select one of the recommendations presented, and then may submit the prompt 120.

Figure 3:
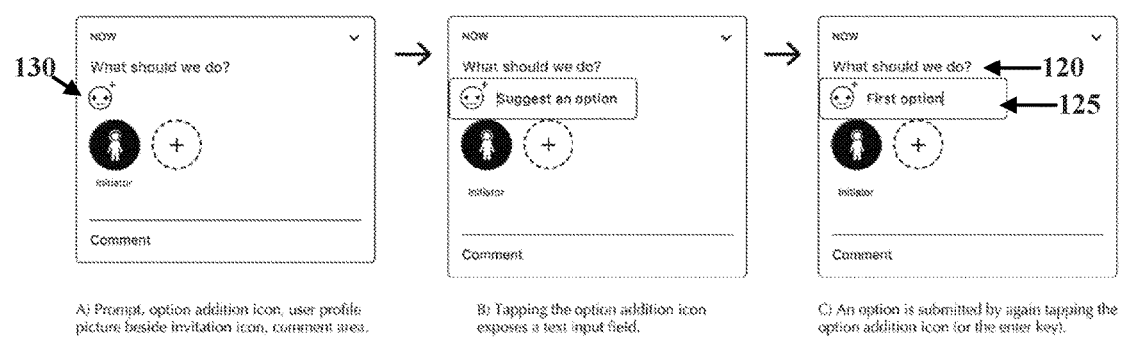
FIG. 3 is a sequence diagram illustrating an input of an option in response to a prompt, according to an example embodiment.

FIG. 3 is a sequence diagram illustrating an input of an option 125 in response to the prompt 120 on the app, according to an example embodiment. In FIG. 3, a newly generated session with a generic example prompt 120, "What should we do?" is displayed, in response to which session participants may submit options that will compete to become the group decision. As illustrated by the sequence in FIG. 3, a user can tap the option addition icon 130 in the app, shown here below the prompt 120, to add options in response to that prompt 120.

The user may input the option 125 created in FIG. 3, or the app may recommend one or more options from which the user may select, for example on the same screen as the line for text entry, via a modal window, or on a separate screen. The user may enter an option or may select one of the recommendations presented, and then may submit the option 125. After the option 125 is submitted, the app may display the option 125 within an area referred to herein as a racetrack 135, shown in the exemplary embodiment below the prompt 120. In the process flowchart of FIG. 16, this process is illustrated as a loop that begins and ends on the initiator decision [Add an option or invite others], through the path labelled "Option".

FIG. 4A illustrates exposure of a single-step racetrack 135 as a result of submitting an initial option 125, according to an example embodiment. In FIG. 4A, the session initiator has contributed the option 125 (with the generic example label "First option") to the racetrack 135, but the session initiator has not yet invited anyone else to the session. There are as many steps 140 on the racetrack 135 as there are participants in the session; therefore, the embodiment illustrated in FIG. 4A has only one step 140 on the racetrack 135. The icon 145, shown in this example as a circular icon, centered on this step 140 marks the position for its adjacent label ("First option" 125) and can provide a visual indication that the user has approved the first option 125.

Figure 9:
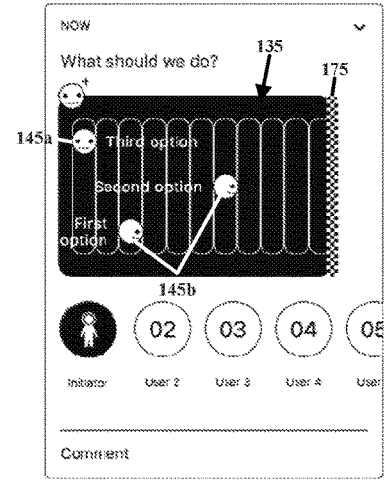
FIG. 9 illustrates addition of a third option by a user other than the session initiator and further movement of the first two options toward the decision threshold, according to an example embodiment.

The convention used in these figures for the visual indication to indicate to the user whether the user has approved an option or not is a slightly-smiling face in frontal view for an option the user has not yet approved (e. g., icon 145a in FIG. 9) and a right-facing profile view of a smiling face for an option that the user has approved (e. g., icon 145b in FIG. 9). (In some cases, in the app, there may be an animated "roll" transition between these states). In many embodiments, adding a new option to a prompt is not a separate action from approving that option; in order for an option to appear on the racetrack, it must have the approval of at least one participant.

FIG. 4B illustrates the exposure of an invitation panel 155 as a result of selecting an invitation icon 150, according to an example embodiment. In FIG. 4B, the session initiator has selected the invitation icon 150 (shown here as a circular icon with dashed border around a plus sign), which may cause the app to reveal the invitation panel 155, for instance below the invitation icon 150. The invitation panel 155 may display a horizontally scrollable list of recently invited, recently active, or otherwise recommended contacts. A user may also directly search their contacts by entering into the input field (which may be displayed as having a dashed underline as shown here). When a contact is selected, the app invites the user represented by the contact to the session and displays in the list of participants the user represented by the contact.

After the session initiator has invited one or more users to the session, the session will also be visible and interactive to the invited user(s), on their devices running the app. In an embodiment of the app with a session setup phase, the app may or may not display to users (other than the session initiator) the invitation icon in the rightmost position of the participant list, depending upon the session (as described in FIG. 1). Similarly, the app may or may not display to users (besides the session initiator) a "Connect related prompt" action among the actions listed in the context menu (which may be accessed via a downward arrow 160 in the upper right corner of the session). In an embodiment of the app without a session setup phase, the app may display to all users and all users may use the invitation icon, but only the session initiator may connect related prompts.

When there is more than one session participant, the app may divide the racetrack into a number of steps equal to the number of session participants. In FIG. 5, the "First option" is on the first step 140, the second and third step 165, 170 are empty, and a decision threshold 175 separates the second step 165 from the third step 170. The decision threshold 175, also referred to herein as a finish line, can be represented in the app display as a checkered vertical bar, such as that shown in FIGS. 5-10.

Figure 10:
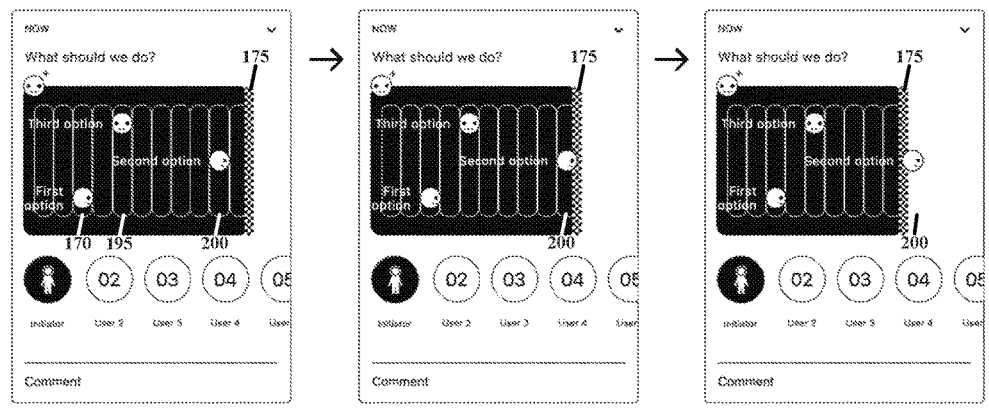
FIG. 10 is a sequence diagram illustrating movement of the second and third options closer to the decision threshold in the first frame, and a lowering of the decision threshold by two steps in the following frames, resulting in the second option crossing the decision threshold, according to an example embodiment.

In various embodiments, the initial position of the decision threshold, or finish line, 175 on the racetrack(s) 135 of a session is between the penultimate and final step, a position that indicates a consensus/unanimous decision. As seen in FIG. 10, the position of the decision threshold, or finish line, 175 may not be fixed throughout a session and may be moved from its initial position. If a session participant has agreed to all existing decisions that a group has made during a session, or if the group has not yet made any decisions in a session, then a session participant may have the ability to lower the finish line 175 one step if they so choose. When a session participant lowers the finish line 175 one step, the effect is to decrease the total number of votes necessary for an option to become a group decision.

FIG. 5 illustrates an invitation of two users, User 2 and User 3, to a group decision-making session, resulting in the subdivision of a racetrack into three steps 140, 165, 170 and exposure of the decision threshold 175, according to an example embodiment. In FIG. 5, the initiator has invited two other users to the session; thus, the session has three participants—Initiator, User 2, and User 3. In FIG. 16, the result of the session initiator's action of inviting other participants is illustrated in the branch of the process flow that starts from the initiator decision point [Add an option or invite others] and ends at the decision point for all users [Add an option, invite others, vote on an option, move the finish line].

FIG. 6 illustrates an invitation of nine additional users to a session and the closure of the invitation panel 155, according to an example embodiment. In FIG. 6, the initiator has invited nine more users to the session, and then closed the user invitation panel; thus, there are now twelve total participants in the exemplary session. Also shown for this exemplary session are twelve steps, including first step 140, second step 165, third step 170, eleventh step 180, and twelfth step 185, and the finish line 175 positioned on the racetrack 135 between the eleventh, or penultimate, step 180 and the twelfth, or final, step 185. In both FIGS. 5 and 6, "First option" only has the approval of the session initiator, who submitted the option 125 in FIG. 4A, prior to inviting any other users to the session.

The minimum number of session participants needed to agree on an option in order for their agreement to count as a group decision naturally varies based on the composition of the group and the nature of the decision being decided. Equally distributed control over the decision threshold, or finish line, 175 allows a group to determine collectively how inclusive their decision will be. The finish line may not appear until the session initiator has invited one or more participants to the session.

To approve an option, a user may select the option's icon, which may be near the option's label. After a user has approved an option, the app may change the appearance of that option's icon for that user (e. g., as described previously), so that the user can easily tell the options for which they have already voted. When a user approves an option, that user's corresponding option icon moves one step to the right and the app displays the option as having moved one additional step toward the finish line 175 (e. g., one step to the right) on the racetrack 135. A participant may rescind approval of an option by selecting it again, in which case the icon moves one step away from the finish line 175 (e. g., to the left) on the racetrack 135. It is noted that the orientation of the racetrack and direction of option icon movement that indicates approval may be reversed in international versions of the app with right-to-left writing systems.

If an option icon is on the first step of the racetrack 135 and the user who submitted that option to the racetrack 135 selects the option, that user will see a dialog box, or other control input display, that allows the user to remove the option from the racetrack. The procedure of option removal is diagrammed in the process flow diagram of FIG. 16 beginning with the "Vote" branch from the decision [Add an option, invite others, vote on an option, move the finish line] and following through each of the "Yes" paths of the next three decision points.

Figure 8:
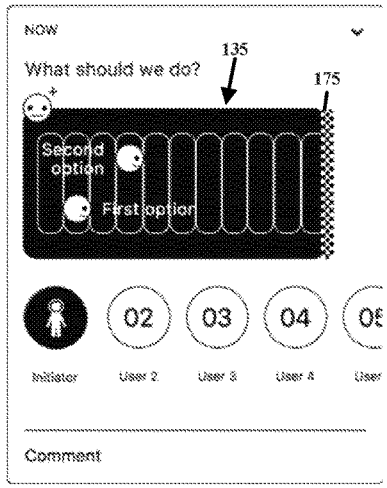
FIG. 8 illustrates movement of first and second options toward a decision threshold as a result of users voting, according to an example embodiment.

FIG. 7 is a sequence diagram illustrating input and submission of a second option 190 by a session initiator, according to an example embodiment. The sequence in FIG. 7 shows the addition of "Second option" 190 to the racetrack 135 by the session initiator. FIG. 8 illustrates movement of first and second options 125, 190 toward a decision threshold as a result of users voting, according to an example embodiment. In FIG. 8, three more participants (four total participants) have voted for "Second option" and one more participant (two total participants) has voted for "First option". As such, the "Second option" is shown on the fourth step toward the finish line 175 and the "First option" is shown on the second step toward the finish line 175. FIG. 9 illustrates addition of a "Third option" 145a by a user other than the session initiator and further movement of the first two options toward the decision threshold 175, according to an example embodiment. In FIG. 9, three more participants (seven total participants) have voted for "Second option" and one more participant (three total participants) has voted for "First option." As such, the "Second option" is shown on the seventh step toward the finish line 175 and the "First option" is shown on the third step toward the finish line 175. In addition, a participant other than the session initiator has submitted a "Third option" 145a to the racetrack 135. To the user who submitted "Third option," the app would display this icon as a right-facing profile as shown in FIG. 9.

FIG. 10 is a sequence diagram illustrating movement of the second and third options closer to the decision threshold 175 in the first frame, and a lowering of the decision threshold 175 by two steps in the following frames, resulting in the second option crossing the decision threshold 175, according to an example embodiment. Between FIG. 9 and FIG. 10, "Third option" receives four more votes and "Second option" receives three more, bringing the vote tally to three, ten, and five for the first, second, and third options, respectively, and thus displaying the first, second, and third options on the third step 170, tenth step 200, and fifth step 195, respectively, toward the finish line 175. In the beginning of the sequence in FIG. 10, the finish line 175 is in its initial position, between the penultimate and final steps. Two participants then lower the finish line 175, one step each (lowered a first step in the second frame a lowered a second step in the third frame), to thus be between the ninth step and the tenth step 200 and resulting in a victory for "Second option". In this example, a participant may be permitted to move the finish line 175 provided that the participant approved the group's existing decisions, provided that moving the finish line 175 would not raise the decision threshold above the number of participants in the session who have agreed to the existing group decisions, and provided that moving the finish line 175 would not lower it below the position that represents the approval of two participants. In FIG. 10, for example, the two users who lowered the finish line 175 may have done so because they did not care to wait for a group consensus on the second option and decided that an agreement between ten of the twelve participants was good enough.

In cases where more than one option submitted to a given prompt occupies a step adjacent to the finish line 175, the finish line 175 cannot be moved to the left (as that action would result in multiple options crossing the finish line simultaneously). The finish line 175 also cannot be moved below the first step, meaning that any option requires the support of a minimum of two session participants to become a decision.

Figure 11:
FIG. 11 illustrates the display of a prompt and the winning option, according to an example embodiment.
Figure 15:
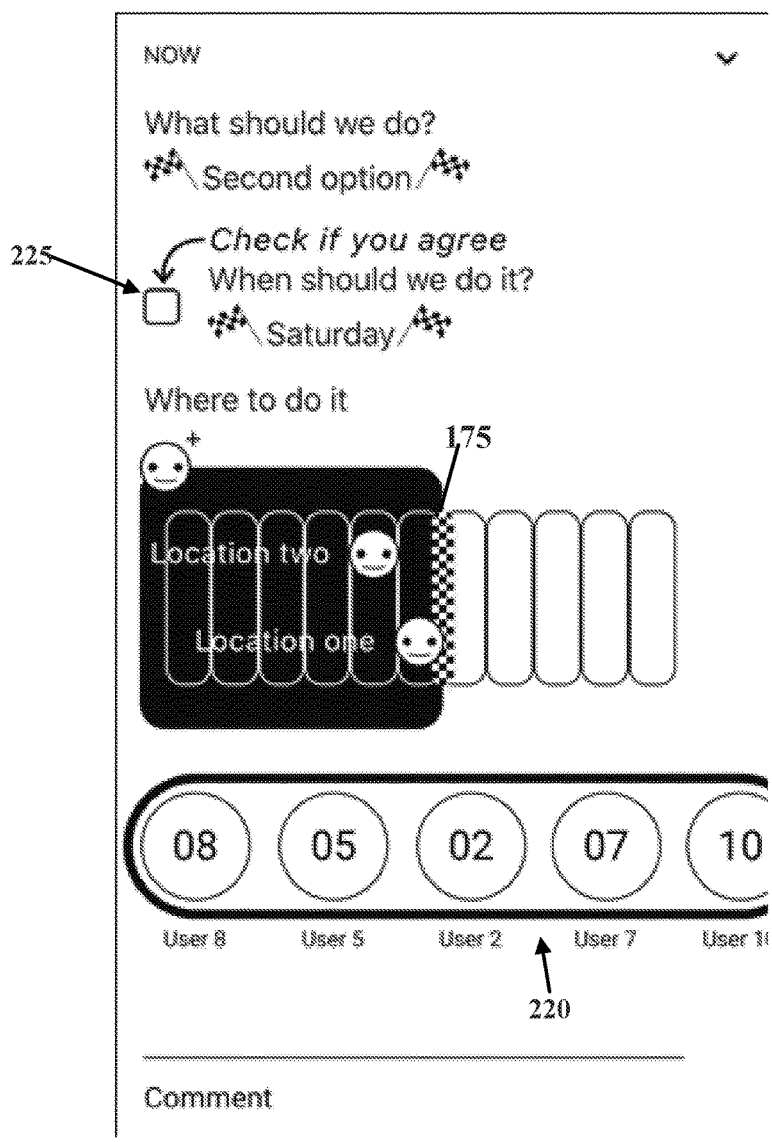
FIG. 15 illustrates a result of the decision threshold being moved with respect to the multiple prompts of FIG. 13, according to an example embodiment.

When an option crosses the finish line 175, as in the last stage of the sequence in FIG. 10, the movement of the option across the finish line, or decision threshold, 175 may be briefly displayed to any participants actively observing the session. This movement action across the finish line 175 may be followed by a collapse of the racetrack into its decided state 205, as represented in FIG. 11, which illustrates the display of a prompt and the winning option, according to an example embodiment, with only the prompt and winning option displayed above the list of participants who voted for it. When an option has crossed the finish line, participants who did not approve the winning option may have a checkbox displayed (the checkbox 225 as shown in FIG. 15), or other control input, signifying agreement to the decision so as to provide such participants with another opportunity, by providing an input thereat, to join in the group decision.

Figure 12:
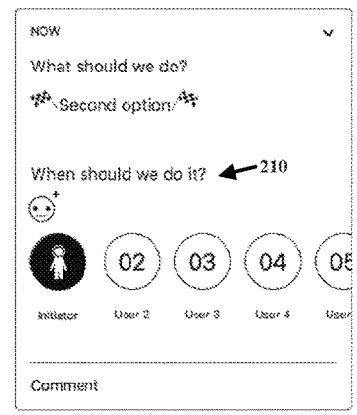
FIG. 12 illustrates an addition of a related prompt for the group to decide upon, according to an example embodiment.

FIG. 12 illustrates addition of a related prompt 210 for the group to decide upon, according to an example embodiment. In FIG. 12, the session initiator has connected the related prompt 210 "When should we do it?" to the session. In an embodiment of the app with a session setup phase, and in which the session initiator has set the prompt creation permission level to (2) or (3), session participants other than the session initiator also have the ability to connect related prompts. Connecting related prompts can be useful in situations in which a group decision has multiple aspects; for example, deciding the what, where, and when aspects of an event, or selecting a show time after choosing which movie to see together.

In one embodiment, only the session initiator has permission to connect a related prompt. A session participant with permission to connect a related prompt may connect a related prompt to a session at any time. It is not necessary to wait for one prompt to be decided before adding a new prompt. In some cases, it will be logical for a group to decide prompts in a sequence rather than in parallel, however, the app does not force groups to make related decisions one at a time.

When one or more prompts have already been decided in a session, the ability to participate in related prompts that have not yet been decided may be restricted to those who have approved the winning option(s) in the decided prompt(s). Furthermore, if a user does not approve the winning option(s) in the decided prompt(s), then that user's existing votes for options in undecided related prompts may be removed, and any option that the user has submitted to an undecided related prompt may be removed, if that option is not approved by a user that has approved the winning option(s) in the decided prompt(s).

If a user is invited to a session that contains one or more prompts that have already been decided by the group, that user's participation in any remaining undecided prompts may be contingent upon approving some or all previous decisions the group has already made. The user may be presented, in the app, with an opportunity to approve or decline existing group decisions by selecting one or more checkboxes, or other control input(s), corresponding to the existing group decisions to signify agreement to the existing group decision(s) prior to being allowed to vote for any group decisions in that session that are not yet decided.

Until such time when the first decision in a session has been made, every time a new user is invited to the session, the racetrack is subdivided by an additional step, such that every option on the racetrack has one more step between it and the finish line.

In various embodiments, after one or more decisions have been made in a session, when a new user is invited to that session the number of steps on the racetrack(s) of any undecided related prompt(s) increases accordingly (e. g., by one step), but the addition of the user to the session does not change the position of the session's decision threshold. When a user has been invited to a session in which one or more decisions have already been made by the session participants and that user takes an action in the interface to affirm the decision(s) that the group has already made (e. g., selecting a checkbox beside the decision(s)), then the number of votes at which an option becomes a group decision increases by one, i. e. the decision threshold moves one step away from the options.

Users who have agreed to the existing group decisions and have already previously lowered the decision threshold may be prevented from raising it in the case that raising the decision threshold would set the number of votes for an option to win higher than the number of participants who have agreed to all existing prompts in that session. In one embodiment, in no circumstance may the decision threshold exceed the number of participants who have agreed to all existing decisions in a session.

In an embodiment, agreeing to already-decided prompts is not a precondition for participating in related prompts and the number of votes required for an option to become a group decision may vary between prompts. In such an embodiment, each newly-connected related prompt has its own finish line initially positioned between its penultimate and final step and independent of the finish line position of any related prompts, such that a given session has no overall decision threshold and adjustments to the finish line position of one prompt have no effect on the finish line positions of related prompts.

Figure 13:
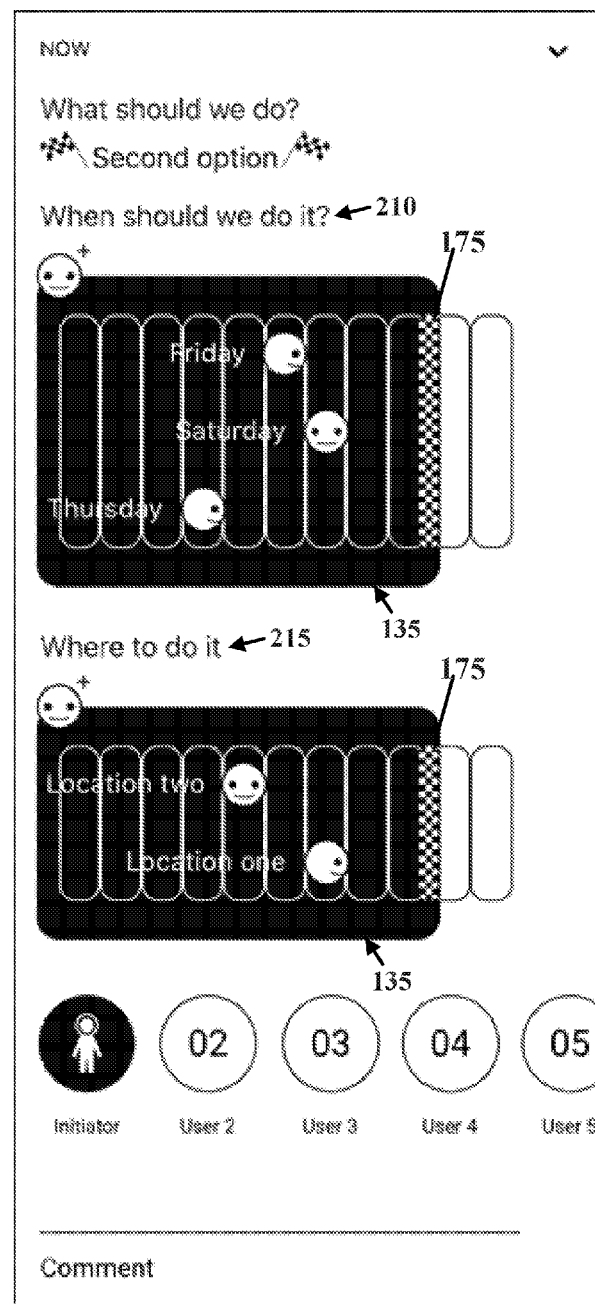
FIG. 13 illustrates the display of multiple prompts, each related to the winning option, for the group to decide upon, according to an example embodiment.

In an embodiment, undecided prompts are displayed below prompts which have been decided and all prompts display above the participant list. FIG. 13 illustrates a continuation of the session illustrated in FIG. 12, wherein participants have submitted the three options "Thursday", "Saturday", and "Friday" to the second prompt ("When should we do it?") 210 and voted upon those options. A third related prompt ("Where to do it") 215 has also been created and two options ("Location one" and "Location two") have been submitted and voted upon by session participants. In FIG. 10, two of the participants moved the finish line two steps closer to the options. These two steps are now to the right of the session's decision threshold 175, visually indicating the difference between the number of votes for an option to win the undecided prompts and the number of votes at which a group would be in unanimous support of an option.

Figure 14:
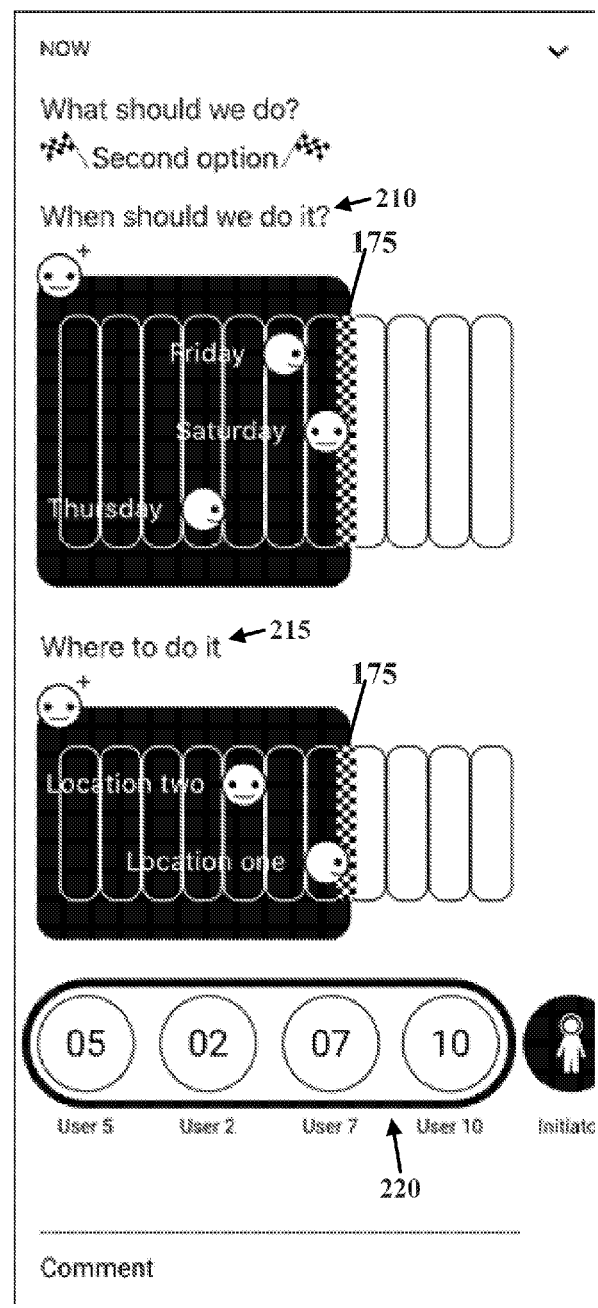
FIG. 14 illustrates movement of the decision threshold with respect to the multiple prompts of FIG. 13, according to an example embodiment.

FIG. 14 illustrates two further lowering movements of the decision threshold 175 closer to the options (e. g., to the left in this example) by the session participants. In the main embodiment described throughout this disclosure, when a participant moves the finish line element in any undecided prompt, its change in position is displayed as a synchronous movement within each and every undecided prompt 210, 215 for that session, consistent with the finish line 175 representing a single threshold at which options win that applies to every prompt in the session (e. g., not to individual prompts in isolation). In FIG. 14 there is one option adjacent to the finish line within each prompt ("Saturday in the prompt 210 and "Location one" in the prompt 215). The option "Saturday" is one vote away from deciding "When should we do it," prompt 210, and the option "Location one" is one vote away winning the prompt "Where to do it," prompt 215. Given that we are witnessing the session in these figures from the perspective of the user labelled "Initiator," we can see that the Initiator has not approved the option "Saturday", but they have approved "Location one" based on what the option icons look like (facing the finish line for an option the user has approved, and the icons of options the user has not approved facing the user).

FIG. 14 illustrates a user action triggering an information visualization 220 which rearranges and circles a subset of the participant list. In an embodiment, the movement of the finish line 175 causes a rearrangement of the list of participants such that the four users who have tapped the finish line (e. g., User 5, User 2, User 7, and User 10) are highlighted as a voting block to all users viewing the session. In an embodiment, moving the finish line and voting on an option are both types of user interactions that may trigger an information visualization 220 such as sorting and circling the participants who have interacted with the element. In an embodiment, this circling mechanism may simultaneously colorize the circle around the participants and the element that the user interacted with to trigger the information visualization 220, be that element an option icon or the finish line.

FIG. 15 illustrates a continuation from FIG. 14, showing the result of User 8 moving the finish line 175, again from the user perspective of the Initiator. User 8 is circled in the information visualization 220 as part of the block of five session participants who have lowered the finish line. By tapping the finish line down, User 8 decided the second prompt 210, "When should we do it?" with the option "Saturday." Because the Initiator is among the session participants who have not yet approved the option "Saturday", they are given the opportunity to do so, shown here in the form of a checkbox 225 beside the hint text "Check if you agree". In an embodiment, the system restricts participants who have not yet approved all existing group decisions from voting or moving the finish line in any undecided prompts, permitting a view-only experience of ongoing races and the ability to comment until such time as the participant agrees to all the existing group decisions.

In an embodiment, upon a decision being made due to a finish line movement occurring, its consequences including effects on participant eligibility may be executed in the order of which prompt was added to the session first. Therefore although the option "Location one" was adjacent to the finish line in FIG. 14 prior to User 8 moving the finish line, once User 8 moved the finish line its effect on the second prompt "When should we do it?" is executed prior to, not simultaneously with, its effects on "Where to do it?", the third prompt 215. When the finish line 175 movement in FIG. 15 occurs, because the Initiator did not agree to the group decision for the now-decided prompt "When should we do it?" the Initiator's votes are removed from all options in undecided races. (In cases in which multiple participants who have agreed to all the prior decisions in a session do not approve a new decision made by the group, the votes of all of these participants in any remaining undecided races are rescinded.) Because the initiator had approved the option "Location one" in the third prompt, their vote is removed from that option. Thus when the finish line moves a step lower in that prompt, "Location one" has already moved down to the sixth step and it therefore does not cross the finish line.

FIG. 16 is a flowchart of possible user actions, as well as front-end and back-end system processes involved in a group deciding one prompt, according to an example embodiment. The flowchart origin ("Begin Process") of FIG. 16 is followed by two initiator actions: the process "Open program" and the process "Add initial prompt to generate session." An example user interface that corresponds to the second of these two processes is illustrated as a sequence diagram in FIG. 2. As a result of the initiator's action, the front-end system enacts the process labelled "Generate a visual field indicating that a new prompt and session have been created. This process is followed by three database processes: first, the process "Create a database instance to record all activity within the new session," second, the process "Create a subclass within the session database to record all activity related to the prompt," and third, the process "Record the prompt name and a null set of options." These three database system processes are followed by two additional front-end system processes: the process "Generate and display the prompt label with no options" and the process "Generate, but do not expose, a racetrack for options."

In FIG. 16, the session initiator may proceed from the decision point labelled "Add an option or invite others?" The sequence diagram in FIG. 3 and FIG. 4A illustrate the process of adding an option in an example user interface. The process of inviting other session participants is illustrated by an example user interface in FIGS. 4B and 5.

In FIG. 16, a session initiator's choice to add an option (prior to inviting other session participants) is represented as a loop in the flowchart beginning and ending on the decision point labelled "Add an option or invite others?", which passes through the initiator process "Add an option". The front-end system then encounters the decision point "Is this the first option?" if it is the first option, the front-end system enacts the process "Expose the racetrack" followed by the process "Display the added option;" if it is not the first option, the racetrack is already exposed to the initiator and the process "Display the added option" is enacted. The back-end system process "Record option with the prompt subclass" is then enacted and the app awaits further action from the initiator.

In FIG. 16, a session initiator's choice to invite one or more other participants to the session is illustrated as the path from the initiator's decision point "Add an option or invite others?" to the decision point for additional users labelled "Add an option, invite others, vote on an option, or move the finish line?" This path begins with the process "Invite other users," which is followed by the front-end system process "Expose the finish line and subdivisions equal to the number of session participants," which is followed by the back-end system process "Grant permission to invited user(s)," which is followed by the front-end system process "Generate and expose the session, prompt, and options as they relate to the additional user(s)." Additional users invited by the initiator then begin their interactions in the session with the process labelled "Open program to view and interact in session." Those users invited to the session may become aware of their invitation to use the app and participate in the session by receiving a message generated by the app outside of the app itself (e. g., by receiving a push notification in the status bar of a mobile device, by receiving an email with a link to the session, etc.).

According to an embodiment illustrated in FIG. 16, the actions available to all session participants may include the four alternatives listed in the process "Add an option, invite others, vote on an option, or move the finish line?" The results of each of these actions are illustrated by a branch of the process flow.

In FIG. 16, the loop in the flowchart by which users invite others begins and ends on the decision point "Add an option, invite others, vote on an option, or move the finish line?" The user process labelled "Invite other users" triggers the front-end system process "Add additional subdivisions equal to the number of session participants," followed by the back-end system process "Grant permission to invited users," and then the further front-end system process "Generate and expose the session, prompt, and options as they relate to additional users." Newly invited users enact the process "Open program to view and interact in session" after which all the actions of the next decision point are available to them.

In FIG. 16, the loop in the flowchart by which users may add options begins and ends on the decision point "Add an option, invite others, vote on an option, or move the finish line?" The user process labelled "Add an option" triggers the front-end system process "Display the added option," followed by the back-end system process "Record option with the prompt subclass and transmit change to other users."

In FIG. 16, the loop in the flowchart by which users may vote on an option begins and ends on the decision point "Add an option, invite others, vote on an option, or move the finish line?" with a branch to the completion of the prompt (and session, in the embodiment shown) in the event that the user's vote causes an option to cross the finish line. The user process labelled "Vote on an option" leads to the front-end system decision point, "Did the user previously vote or submit the option?" If either is true, the front-end system further triggers the decision point, "Is the user's vote the only one?" to logically separate out the two cases stated in the prior decision point. If it is true that the user has already voted for the option and their vote is the only vote that option, then it is appropriate for the front-end system to expose the user decision point "Delete option?" (e. g., in the form of a dialog box). If the user selects "No" (or, in an embodiment, taps anywhere other than "Yes" on the dialog box), the process will "Make no change" and return to the original decision point of the loop. If the user selects "Yes" in response to the "Delete option?" decision point, then the front-end system process, "Delete option" is triggered, and the back-end system process, "Record option removal and transmit change to other users" is enacted, at which point the loop returns to the original user decision point. If it is true that the user has already voted for the selected option but their vote is not the only vote for that option, then the front-end system process "Move the option back (to left)" is triggered; if the user has not already voted for the selected option, the front-end system process "Move the option forward (to right)" is triggered. In either of these two cases, movement of an option is followed by the back-end system process, "Record option with the prompt subclass and transmit change to other users" and the back-end system decision point, "Is one option past the finish line?" If the movement of the option caused by the user's vote has not caused it to cross the finish line, then the loop returns to the original user decision point. If an option has crossed the finish line as a result of the user's vote, the database registers this change for all session participants, then the front-end system process "Display the winning option and conclude the prompt" is enacted, leading to FIG. 16's flowchart terminal point "Activity complete".

In FIG. 16, the loop in the flowchart by which users may move the finish line begins and ends on the decision point "Add an option, invite others, vote on an option, or move the finish line?" with a branch to the completion of the prompt (and session, in the embodiment shown) in the event that the user's movement of the finish line causes a single option to cross it. The user process labelled "Move the finish line" triggers the front-end system decision point "Did the user previously move the finish line back?" If this is the case, then the front-end system process, "Move finish line forward (to right)" is triggered and the loop returns to the user's original decision point. If the user has not already lowered the finish line, then the back-end system decision point, "Will two (or more) options cross the finish line if moved?" is triggered. If two or more options would cross the finish line as a result of the finish line moving back (to left), then the back-end system process "Make no change to the finish line" will be triggered, at which point the loop will return to the user's original decision point. If moving the finish line back (to left) would not result in multiple options crossing it, then the front-end system process, "Move finish line back (to left)" is enacted and followed by the back-end system decision point "Is one option past the finish line?" If the movement of the finish line by the user has not caused it to cross an option, then the loop returns to the original user decision point. If the finish line has crossed an option as a result of the user moving it, the database registers this change for all session participants, then the front-end system process "Display the winning option and conclude the prompt" is enacted, leading to FIG. 16's flowchart terminal point "Activity complete". The sequence diagram in FIG. 10 illustrates one user lowering of the finish line a step, followed by another user lowering it a step; the second user's movement of the finish line results in the option labelled "Second option" crossing it, leading to the front-end system displaying "Second option" as the winner of the prompt "What should we do?" as illustrated in FIG. 11, where the racetrack is collapsed and no options besides the winner are shown.

In the form of a flowchart, FIG. 16 illustrates an example embodiment of user actions in a single session with only one prompt and settings that allow each participant to invite others, add options, vote on options and move the finish line. The possibility of the initiator (or other users) submitting one or more related prompts is omitted from the FIG. 16 flowchart for the sake of visual and explanatory simplicity, although the user interactions and system rules pertaining to the creation and use of related prompts is detailed elsewhere in this disclosure.

Figure 17:
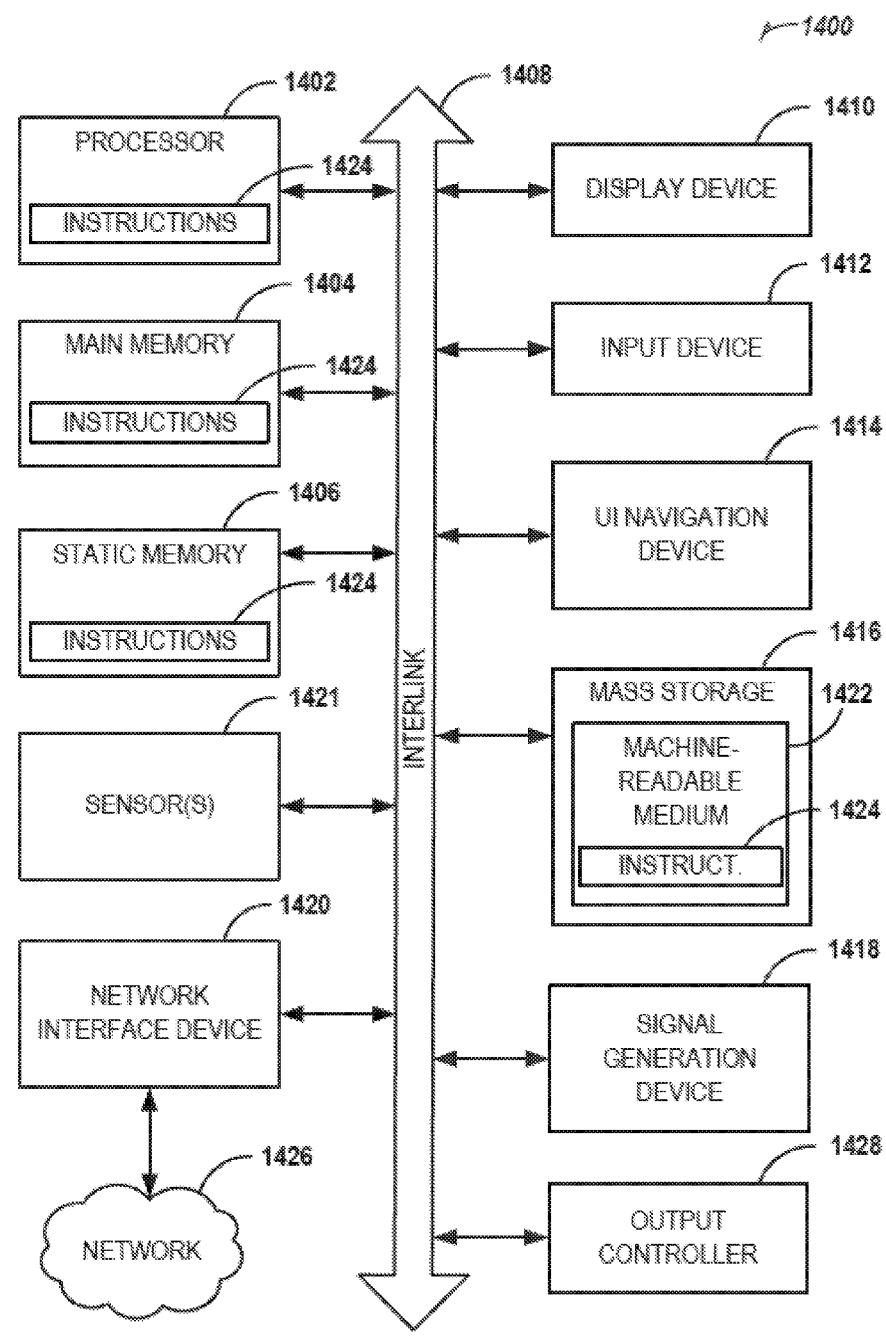
FIG. 17 is a block diagram illustrating an example of a machine, upon which any one or more example embodiments may be implemented.

FIG. 17 is a block diagram illustrating an example of a machine 1400, upon which any one or more example embodiments disclosed herein may be implemented. In alternative embodiments, the machine 1400 may operate as a standalone device or may be connected (e. g., networked) to other machines. In a networked deployment, the machine 1400 may operate in the capacity of a server machine, a client machine, or both in a client-server network environment. In an example, the machine 1400 may act as a peer machine in a peer-to-peer (P2P) (or other distributed) network environment. The machine 1400 may implement or include any portion of the systems, devices, or methods illustrated in FIGS. 1-16, and may be a computer, a server, or any machine capable of executing instructions (sequential or otherwise) that specify actions to be taken by that machine. Further, although only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations, etc.

Examples, as described herein, may include, or may operate by, logic or a number of components, modules, or mechanisms. Modules are tangible entities (e. g., hardware) capable of performing specified operations and may be configured or arranged in a certain manner. In an example, circuits may be arranged (e. g., internally or with respect to external entities such as other circuits) in a specified manner as a module. In an example, the whole or part of one or more computer systems (e. g., a standalone, client or server computer system) or one or more hardware processors may be configured by firmware or software (e. g., instructions, an application portion, or an application) as a module that operates to perform specified operations. In an example, the software may reside on a machine-readable medium. In an example, the software, when executed by the underlying hardware of the module, causes the hardware to perform the specified operations.

Accordingly, the term "module" is understood to encompass a tangible entity, be that an entity that is physically constructed, specifically configured (e. g., hardwired), or temporarily (e. g., transitorily) configured (e. g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

Machine (e. g., computer system) 1400 may include a hardware processor 1402 (e. g., a central processing unit (CPU), a graphics processing unit (GPU), a hardware processor core, or any combination thereof), a main memory 1404 and a static memory 1406, some or all of which may communicate with each other via an interlink (e. g., bus) 1408. The machine 1400 may further include a display unit 1410, an alphanumeric input device 1412 (e. g., a keyboard), and a user interface (UI) navigation device 1414 (e. g., a mouse). In an example, the display unit 1410, input device 1412 and UI navigation device 1414 may be a touch screen display. The machine 1400 may additionally include a storage device (e. g., drive unit) 1416, a signal generation device 1418 (e. g., a speaker), a network interface device 1420, and one or more sensors 1421, such as a global positioning system (GPS) sensor, compass, accelerometer, or other sensor. The machine 1400 may include an output controller 1428, such as a serial (e. g., USB, parallel, or other wired or wireless (e. g., infrared (IR), near field communication (NFC), etc.) connection to communicate or control one or more peripheral devices (e. g., a printer, card reader, etc.)

The storage device 1416 may include a machine-readable medium 1422 on which is stored one or more sets of data structures or instructions 1424 (e. g., software) embodying or utilized by any one or more of the techniques or functions disclosed herein. The instructions 1424 may also reside, completely or at least partially, within the main memory 1404, within static memory 1406, or within the hardware processor 1402 during execution thereof by the machine 1400. In an example, one or any combination of the hardware processor 1402, the main memory 1404, the static memory 1406, or the storage device 1416 may constitute machine-readable media.

Although the machine-readable medium 1422 is illustrated as a single medium, the term "machine-readable medium" may include a single medium or multiple media (e. g., a centralized or distributed database, and/or associated caches and servers) configured to store the one or more instructions 1424.

The term "machine-readable medium" may include any medium that is capable of storing, encoding, or carrying instructions for execution by the machine 1400 and that cause the machine 1400 to perform any one or more of the techniques of the present disclosure, or that is capable of storing, encoding or carrying data structures used by or associated with such instructions. Non-limiting machine-readable medium examples may include solid-state memories, and optical and magnetic media. Accordingly, machine-readable media are not transitory propagating signals. Specific examples of machine-readable media may include non-volatile memory, such as semiconductor memory devices (e. g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); Solid State Drives (SSD); and CD-ROM and DVD-ROM disks.

The instructions 1424 may further be transmitted or received over a communications network 1426 using a transmission medium via the network interface device 1420 utilizing any one of a number of transfer protocols (e. g., frame relay, Internet protocol (IP), transmission control protocol (TCP), user datagram protocol (UDP), hypertext transfer protocol (HTTP), etc.). Example communication networks may include a local area network (LAN), a wide area network (WAN), a packet data network (e. g., the Internet), mobile telephone networks (e. g., cellular networks), Plain Old Telephone (POTS) networks, and wireless data networks (e. g., Institute of Electrical and Electronics Engineers (IEEE) 802. These can include eleven family of standards known as WiFi®, IEEE 802, sixteen family of standards known as WiMAX®), IEEE 802, four family of standards, Bluetooth®, Bluetooth® low energy technology, ZigBee®, peer-to-peer (P2P) networks, among others. In an example, the network interface device 1420 may include one or more physical jacks (e. g., Ethernet, coaxial, or phone jacks) or one or more antennas to connect to the communications network 1426. In an example, the network interface device 1420 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 1400, and includes digital or analog communications signals or other intangible medium to facilitate communication of such software.

Conventional terms in the fields of computer systems and computer networking have been used herein. The terms are known in the art and are provided only as a non-limiting example for convenience purposes. Accordingly, the interpretation of the corresponding terms in the claims, unless stated otherwise, is not limited to any particular definition.

Although specific embodiments have been illustrated and described herein, it will be appreciated by those of ordinary skill in the art that any arrangement that is calculated to achieve the same purpose may be substituted for the specific embodiments shown. Many adaptations will be apparent to those of ordinary skill in the art. Accordingly, this application is intended to cover any adaptations or variations.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. Moreover, in the following claims, the terms "first," "second," and "third," etc. are used merely as labels, and are not intended to impose numerical requirements on their objects.

Various examples have been described with reference to certain disclosed embodiments. The embodiments are presented for purposes of illustration and not limitation. For example, the above-described examples (or one or more aspects thereof) may be used in combination with each other. One skilled in the art will appreciate that various changes, adaptations, and modifications can be made without departing from the scope of the invention.

In this Detailed Description, various features may have been grouped together to streamline the disclosure. This should not be interpreted as intending that an unclaimed disclosed feature is essential to any claim. Rather, inventive subject matter may lie in less than all features of a particular disclosed embodiment.

Example 1

The following description details one Example for purposes of illustration. It is to be understood that various embodiments disclosed elsewhere herein can include one or more (e. g., all) of the features described in connection with this Example but that no portion of this Example is intended to limit the scope of this disclosure.

The following table provides some exemplary definitions of terms used in the description of this Example:

| | |
|---|---|
| Private session | A session in which participation is by invitation only (besides the participation of the creator of the session) and in which participants collectively determine the number of votes to win. |
| Participant | A user that has started a session or been invited to it. |
| Prompt | A matter that participants can vote upon. |
| Option | A response to a prompt that participants can approve or not. |
| Race | The competing set of options in response to a prompt that is not yet decided. |
| Finish line | The boundary condition at which an option has enough votes to win. This term may sometimes be referred to as "decision threshold." |
| Winning option | An option that attains the number of votes to win. |
| Decision | A prompt and winning option as a pair. |

The following table provides some exemplary definitions of variables used in the description of this Example:

| Variable | Number of . . . |
|---|---|
| p | participants |
| $p_e$ | eligible participants |
| $p_i$ | ineligible participants |
| f | votes to win |
| L | finish line downvotes |
| d | decisions |

In this Example, each participant can have a Boolean e for his/her eligibility. Also in this Example, each participant can have a Boolean FLDV for his or her finish line downvote.

In this Example, steps can be included in a race. Any one or more (e. g., all) races in a session can be divided into p steps. Participant eligibility may not affect the number of steps. At p=1: show p steps. When p>1: show p−1 steps.

In this Example, options can be approved by participants. An option approved by p participants can be positioned on step p. An option either is or is not approved by a participant. An option enters a race with the approval of the participant who created it. When an eligible participant taps an option, it changes their approval of that option. When an eligible participant taps an option that has no approval from other participants, this eligible participant can be asked to confirm his or her removal of that option from the race. An option that is not approved by any participant can be removed from the race. If an option is approved by f participants, it can be determined to have won the race.

In this Example, when an option wins a race the race has permanently ended. After an option has won, it can be approved by participants who have not yet approved it via a "check if you agree" checkbox beside the decision. Participants may not be able to remove their approval from specific winning options; if a participant exits the session, their approval can be removed from all winning options. When an option wins, it may permanently be the winner and the race may permanently be ended.

Some or all participants can be eligible participants. In this Example, if a participant has approved d decisions, their e is true. When participant e is false, that participant cannot interact with prompts or races. At d=0: $p=p_e$ and $p_i=0$. At d=0, participants initialize with e=true. When d>0: $p=p_e+p_i$. When d>0, participants initialize with e=false. If a participant e becomes false: that participant's FLDV is unaffected, that participant's votes can be removed from options permanently, and prompts that participant created that do not have races can be removed permanently.

A race can include a finish line, or decision threshold. In this Example, a true FLDV contributes one to the sum L. At d=0, newly-invited participants initialize with FLDV=false. When d>0, newly-invited participants initialize with FLDV=true (increasing both p and L by 1). If a participant initialized with FLDV=true approves d decisions, their FLDV resets to false, decreasing L by one. Finish line position, f can be restricted to the range (two, $p_e$) inclusive. At p=1: do not show the finish line. When p>1: f=p−L. When p>1: the finish line is positioned on the boundary of step f−1 and step f. If a participant e is true and they tap the finish line, the action will toggle their FLDV, provided that: if FLDV=true, f+1≤$p_e$ else if FLDV=false, f−1≥2 and [number of options in the race with (f−1) votes]<2 (i. e. the action occurs if the resulting change to L would not cause f to exceed its range, and that if f is lowered it would not cross 2 or more options). If an increase in L causes multiple races to each have an option with f approvals, changes to participant eligibility and option positions that may result from the decision in the earliest race are first applied to other races, possibly affecting whether decisions occur in the other races.

In this example, a session can be exited. If a participant exits the session: that participant's participant FLDV is no longer part of the sum L (therefore if that participant's FLDV was false, the decrease of one p causes a decrease of 1 f, and if that participant's FLDV was true, the decrease of one p and decrease of one L will cancel, causing no change to f); that participant's votes can be removed from options permanently; prompts they have created that do not have races can be removed permanently. That participant's comments and comment metadata can remain. Anyone the participant invited remains. Any or all of these features can apply to sessions with any value d.

When a session exit occurs in which the participant FLDV is false: if [number of options in the race with (f−1)

votes]≥2, the winning option can be be quasi-randomly selected from the options with f−1 votes.

What is claimed is:

1. A computer-implemented method for making one or more decisions in a group decision-making session, the method comprising the steps of:
   receiving a group initiation input specifying a number of participants to be invited to the group decision-making session;
   receiving input specifying a first prompt along with a first option that pertains to the first prompt and a second option that pertains to the first prompt;
   receiving, from one or more participants in the group decision-making session, votes for at least one of the first option or the second option;
   displaying a racetrack comprising:
      a first icon representing the first option,
      a second icon representing the second option,
      a number of individual steps, wherein the first icon is displayed on one step of the number of individual steps that corresponds to a number of votes received for the first option and the second icon is displayed on one step of the number of individual steps that corresponds to a number of votes received for the second option, and
      a first finish line representing a threshold number of votes needed to determine a winning option for the first prompt, wherein the first finish line is initially positioned after one step of the number of individual steps that corresponds to a number of votes that is one less than the threshold number of votes; and
   receiving, from a first participant in the group decision-making session, a first finish line adjustment input;
   in response to the first finish line adjustment input, moving a position of the first finish line so as to adjust the threshold number of votes needed to determine the winning option for the first prompt; and
   displaying the first option as the winning option for the first prompt in response to the first icon crossing the first finish line.

2. The method of claim 1, wherein each participant in the group decision-making session is enabled to contribute up to one vote for the first option and up to one vote for the second option.

3. The method of claim 1, wherein the number of individual steps included in the racetrack equals a number of participants in the group decision-making session.

4. The method of claim 3, wherein, prior to receiving the first finish line adjustment input from the first participant in the group decision-making session, the threshold number of votes needed to determine the winning option for the first prompt is equal to the number of participants in the group decision-making session such that the first finish line is initially positioned between a penultimate step and a final step in the number of individual steps included in the racetrack.

5. The method of claim 4, wherein, in response to receiving the first finish line adjustment input from the first participant in the group decision-making session, the position of the first finish line is moved so as to decrease the threshold number of votes needed to determine the winning option for the first prompt.

6. The method of claim 5, wherein the position of the first finish line is moved down one step such that the position of the first finish line is moved to be after one step of the number of individual steps that corresponds to a number of votes that is two less than the number of participants in the group decision-making session.

7. The method of claim 5, wherein, in response to receiving the first finish line adjustment input from the first participant in the group decision-making session and moving a position of the first finish line, the method further comprises the step of:
   disabling another first finish line adjustment input from the first participant in the group decision-making session.

8. The method of claim 1, further comprising the steps of:
   receiving, from a second participant in the group decision-making session, another first finish line adjustment input; and
   in response to the another first finish line adjustment input, moving the position of the first finish line so as to further adjust the threshold number of votes needed to determine the winning option for the first prompt.

9. The method of claim 1, further comprising the step of:
   displaying participants in the group decision-making session in a participant list, wherein, upon receiving a vote for the first option from the first participant in the group decision-making session, a subset of participants in the participant list who have voted for the first option, including the first participant, are arranged together and displayed as a first option voting block.

10. The method of claim 1, wherein the first icon is displayed to the first participant in the group decision-making session as a first type of visual indication indicating that the first participant has voted for the first option, and wherein the second icon is displayed to the first participant as a second, different type of visual indication indicating that the first participant has not voted for the second option.

11. The method of claim 1, further comprising the steps of:
   receiving input specifying a second prompt along with a third option that pertains to the second prompt and a fourth option that pertains to the second prompt; and
   displaying a second racetrack comprising:
      a third icon representing the third option,
      a fourth icon representing the fourth option,
      a number of individual steps, wherein the third icon is displayed on one step of the number of individual steps that corresponds to a number of votes received for the third option and the fourth icon is displayed on one step of the number of individual steps that corresponds to a number of votes received for the fourth option, and
      a second finish line representing a threshold number of votes needed to determine a winning option for the second prompt.

12. The method of claim 11, wherein movement of the position the first finish line in response to the first finish line adjustment input causes the second finish line to move correspondingly such that the threshold number of voted needed to determine the winning option for the first and second prompts is the same.

13. The method of claim 12, further comprising the step of:
   receiving a second finish line adjustment input; and
   in response to the second finish line adjustment input, moving a position of the second finish line so as to adjust the threshold number of votes needed to determine the winning option for the second prompt,
   wherein, when the first icon has crossed the first finish line, only those participants in the group decision-making session from whom a vote for the first option has been previously received are enabled to input the second finish line adjustment input.

14. The method of claim 11, further comprising the step of:
receiving votes for at least one of the third option or the fourth option,
wherein, when the first icon has crossed the first finish line, votes for the at least one of the third option or the fourth option received from any participant in the group-decision making session who has not approved the first option are removed.

15. The method of claim 1, wherein the participants in the group decision-making session are each located at geographically different locations, and wherein each of the group initiation input, the input specifying the first prompt along with the first option that pertains to the first prompt and the second option that pertains to the first prompt, the votes for the at least one of the first option or the second option, and the first finish line adjustment input are received over a network interconnecting the participants in the group decision-making session.

16. A non-transitory computer-readable storage article having computer-executable instructions stored thereon to cause at least one programmable processor to:
display a first prompt in response to user input specifying the first prompt;
display a racetrack that comprises:
a first icon representing a first option that pertains to the first prompt,
a second icon representing a second option that pertains to the first prompt,
a number of individual steps, wherein the first icon is displayed on one step of the number of individual steps that corresponds to a number of votes for the first option and the second icon is displayed on one step of the number of individual steps that corresponds to a number of votes for the second option, and
a first finish line representing a threshold number of votes needed to determine a winning option for the first prompt, wherein the first finish line is initially positioned after one step of the number of individual steps that corresponds to a number of votes that is one less than the threshold number of votes, and wherein a position of the first finish line is movable in response to user input so as to adjust the threshold number of votes needed to determine the winning option for the first prompt; and
display the first option as the winning option for the first prompt in response to the first icon crossing the first finish line.

17. The article of claim 16, wherein the number of individual steps included in the racetrack equals a number of participants invited to a group decision-making session.

18. The article of claim 17, wherein participants invited to the group decision-making session are displayed in a participant list, and wherein a subset of participants in the participant list having voted for the first option are arranged together and displayed as a first option voting block.

19. The article of claim 16, wherein the first icon is displayed as a first type of visual indication indicating that the user has voted for the first option, and wherein the second icon is displayed as a second, different type of visual indication indicating that the user has not voted for the second option.

20. The article of claim 16, wherein computer-executable instructions stored thereon further cause at least one programmable processor to:
display a second prompt in response to user input specifying the second prompt, the second prompt being related to the first prompt;
display a second racetrack that comprises:
a third icon representing a third option that pertains to the second prompt;
a fourth icon representing a fourth option that pertains to the second prompt,
a number of individual steps, wherein the third icon is displayed on one step of the number of individual steps that corresponds to a number of votes for the third option and the fourth icon is displayed on one step of the number of individual steps that corresponds to a number of votes for the fourth option, and
a second finish line representing a threshold number of votes needed to determine a winning option for the second prompt, wherein movement of the position of one of the first finish line and the second finish line in response to user input causes the other of the first finish line and the second finish line to move correspondingly such that the threshold number of voted needed to determine the winning option for the first and second prompts is the same.

* * * * *